US010971994B2

(12) United States Patent
Steinke et al.

(10) Patent No.: US 10,971,994 B2
(45) Date of Patent: Apr. 6, 2021

(54) ARTIFICIAL STABLE SHORT CIRCUIT FAILURE MODE FUNCTION BY USING PARALLEL MODULES FOR EACH SWITCHING FUNCTION (71) Applicant: ABB Schweiz AG, Baden (CH)

(72) Inventors: Juergen Steinke, Albbruck (DE); Philippe Maibach, Muhen (CH)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 16/543,764

(22) Filed: Aug. 19, 2019

(65) Prior Publication Data
US 2020/0083800 A1 Mar. 12, 2020

(30) Foreign Application Priority Data
Sep. 6, 2018 (EP) .................................. 18193021

(51) Int. Cl.
H02M 1/32 (2007.01)
H02M 7/49 (2007.01)
H02M 7/483 (2007.01)

(52) U.S. Cl.
CPC .............. H02M 1/32 (2013.01); H02M 7/49 (2013.01); H02M 2007/4835 (2013.01)

(58) Field of Classification Search
CPC .......... H02M 1/32; H02M 1/12; H02M 1/084; H02M 1/4216; H02M 1/36; H02M 1/081;
(Continued)

(56) References Cited
U.S. PATENT DOCUMENTS
9,054,526 B2 * 6/2015 Korn .................. H02H 7/10
9,553,441 B2 * 1/2017 Volkel ................ H02H 3/20
(Continued)

FOREIGN PATENT DOCUMENTS
EP 2369725 A1 9/2011
EP 2958226 A2 12/2015
EP 2958226 A3 3/2016

OTHER PUBLICATIONS
Maharjan et al. "Fault-Tolerant Operation of a Battery-Energy-Storage System Based on a Multilevel Cascade PWM Converter With Star Configuration" IEEE Transactions on Power Electronics, vol. 25, No. 9, Sep. 2010, p. 2386-2396.
(Continued)

Primary Examiner — Thienvu V Tran
Assistant Examiner — Nusrat Quddus
(74) Attorney, Agent, or Firm — Slater Matsil, LLP (57) ABSTRACT The application discloses an arrangement of switches for a voltage source converter cell, the voltage source converter cell having two AC terminals, wherein the arrangement of switches forms a number of parallel series circuits (branches, current paths), wherein the switches in each of the series circuits paths are being controlled by external signals to alter a conductivity status of the switches between an "ON"-state and an "OFF"-state. The external signals are generated by one or more control units, and the two AC terminals are each connected to subsets of the series circuits of the switches. The control units comprises failure detection means, the failure detection means being adapted to determine a defective switch in the series circuits by predetermined conditions. The control units are further configured to output a control signal to alter a conductivity condition of each of the switches in the series circuits in such a manner, that a short circuit between the two AC terminals is created, if one of the switches is determined as being defective according to the predetermined conditions.

19 Claims, 6 Drawing Sheets (58) Field of Classification Search
CPC .... H02M 1/082; H02M 1/088; H02M 1/0845; H02M 7/49; H02M 7/483; H02M 7/48; H02M 7/5387; H02M 7/217; H02M 7/219; H02M 7/484; H02M 7/521; H02M 7/02; H02M 7/42; H02M 7/53846; H02M 7/12; H02M 7/125; H02M 7/06; H02M 7/08; H02M 7/44; H02M 2001/322; H02M 2001/325; H02M 2001/0006; H02M 2001/0074; H02M 2001/0067; H02M 2001/007; H02M 2007/4835; H02M 3/158; H02M 3/33507; H02M 3/33584; H02M 3/285; H02M 3/33592; H02M 5/44; H02M 5/293; H02J 3/34; H02J 2001/002; H02J 1/1022; H02H 3/20; H02H 3/00; H02H 7/16; H02H 7/10; H02H 7/062; H02H 7/12; H02H 7/125; H02H 7/1252; H02H 7/1255

See application file for complete search history.

(56) References Cited

U.S. PATENT DOCUMENTS

| | | | | |
|---|---|---|---|---|
| 9,570,987 | B2* | 2/2017 | Trinh | H02M 3/33507 |
| 9,722,502 | B2* | 8/2017 | Steimer | H02M 5/293 |
| 9,866,120 | B2* | 1/2018 | Koyanagi | H02M 1/32 |
| 2011/0235221 | A1 | 9/2011 | Vögeli | |
| 2013/0155739 | A1* | 6/2013 | Itako | G05F 5/00 363/95 |
| 2013/0217056 | A1* | 8/2013 | Crawford | G01N 33/6893 435/18 |
| 2013/0279211 | A1* | 10/2013 | Green | H02J 3/36 363/35 |
| 2014/0327400 | A1* | 11/2014 | Kudo | H02J 7/0014 320/118 |
| 2016/0301322 | A1* | 10/2016 | Choi | H02M 5/458 |
| 2017/0012521 | A1* | 1/2017 | Jimichi | H02M 1/32 |
| 2018/0159422 | A1* | 6/2018 | Kikuchi | H02M 1/32 |
| 2018/0215269 | A1* | 8/2018 | Alam | B60L 15/007 |
| 2019/0052187 | A1* | 2/2019 | Geske | H02M 7/66 |
| 2019/0131885 | A1* | 5/2019 | Dorn | H02M 1/32 |
| 2019/0207533 | A1* | 7/2019 | Kikuchi | H02M 7/797 |
| 2019/0280614 | A1* | 9/2019 | Koyanagi | H02M 7/48 |

OTHER PUBLICATIONS

Search Report issued in European Priority Application 18193021.5, dated Feb. 27, 2019.

* cited by examiner

ARTIFICIAL STABLE SHORT CIRCUIT FAILURE MODE FUNCTION BY USING PARALLEL MODULES FOR EACH SWITCHING FUNCTION

FIELD

The present application is on the field of voltage conversion systems in the medium—or high voltage area. In particular, the present application is on the field of construction and operation of modular multilevel converter (MMC) cells. The present application provides methods and devices for an improved failure tolerance of an MMC cell in case of a failure of high-power semiconductors.

BACKGROUND OF INVENTION

Semiconductor modules usually include several parallel chips per switching function, each connected to a related electrode via bond wires. A typical failure mode of such a module is, that one of the parallel arranged chips fails and may short module terminals. This may also include control terminals, which are e.g. Gate and Emitter for an IGBT.

By this, the healthy chips in the parallel arrangement cannot be controlled anymore by a standard Gate Driver. In a converter, like a two-level voltage source converter, this may be not problematic, as the switching function may be unique and once it cannot be switched between on and off on demand anymore, the converter anyhow has to be shut down.

But in converters, known as chain-link converters or Modular Multilevel Converter (MMC), the modules are providing the switching functions for the cells, either full-bridge cells for the chain-link converter or half-bridge cells for the Modular Multilevel Converter.

These converters include series connected cells and it is expected, that these converters do not stop operation after a single semiconductor fault. This can be achieved by shorting the AC-terminals of the cell concerned. Due to the fact that a module including a broken chip cannot be safely loaded continuously with the operational current, module based chain-link and MMC include dedicated AC-terminal shorting devices, attached between the AC terminals. These might be mechanical switches, moved by springs, electro-mechanically force or pyrotechnically, or even additional semiconductor switches. These switches or devices add costs without contributing any additional operational advantage.

There are several ways to at least improve an overload situation of the switches. One is, to replace modules with modules having a higher power capability. But increasing the allowed operational current in a converter by replacing the smaller modules by bigger ones may not improve the situation in a fault case. Solutions for improved control of power modules are therefore highly appreciated.

SUMMARY OF INVENTION

In order to address the foregoing and other potential problems, embodiments of the present disclosure propose, in a first aspect, an arrangement of switches for a voltage converter cell.

The voltage converter cell may have two AC terminals. The arrangement of switches may form a number of 2N parallel current paths. Instead of current paths, the term "branches" or "serial circuits" or "series connections" may alternatively be used. The number N may be greater or equal "2", and wherein the switches in each of the 2N series connections are being controlled by external signals to alter a conductivity status of the switches between an "ON"-state and an "OFF"-state. The external signals may be generated by one or more control units, and the two AC terminals may be each connected to subsets of the 2N current paths with the switches. The control units may comprise failure detection means, the failure detection means may be adapted to determine a defective switch by predetermined conditions. The control units may be further configured to output a control signal to alter a conductivity condition of each of the 2N current paths in such a manner, that a short circuit between the two AC terminals (AC1, AC2) may be created, if one of the switches may be determined as being defective according to the predetermined conditions.

In another aspect, an arrangement of switches for a voltage converter cell may be disclosed, the voltage converter cell having two AC terminals. The arrangement of switches may form a number of N+1 two parallel current paths or branches. The number N may be greater or equal "1" and wherein the switches in each of the N+1 current paths are being controlled by external signals to alter a conductivity status of the switches between an "ON" state and an "OFF" state, the external signals being generated by one or more control units, and wherein the two AC terminals are connected to the N+1 current paths with the switches, wherein the control units comprise failure detection means, the failure detection means being adapted to determine a defective switch by predetermined conditions and wherein the control units are further configured to output a control signal to alter a conductivity condition of each of the N+1 current paths/branches/series connection in such a manner, that a short circuit between the two AC terminals may be created, if one of the switches may be determined as being defective according to the predetermined conditions.

In yet a further aspect, a modular multilevel converter cell may be disclosed. The modular multilevel converter cell may comprise an arrangement of switches according to aspects or embodiments of the present invention, wherein the arrangement of switches may be adapted for a modular multilevel converter cell with a half-bridge topology or for a modular multilevel converter cell with a full-bridge topology.

Another aspect and discloses a method for shorting AC terminals of a modular multilevel converter cell. The method may comprise in particular determining a defective switch by predetermined conditions and in particular activating a current path in form of a semiconductor-based short circuiting device or activating switches in the current paths such, that a short circuit between the AC terminals may be generated.

BRIEF DESCRIPTION OF DRAWINGS

Embodiments of the present disclosure will be presented in the sense of examples and their advantages are explained in greater detail below, with reference to the accompanying drawings, wherein.

DETAILED DESCRIPTION OF EMBODIMENTS

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that may be different from the ordinary and customary meaning as understood by those skilled in the art, may be intended to be implied by consistent usage of the term or phrase herein. To the extent that a term or phrase may be intended to have a special meaning, i.e., a meaning other than that understood by skilled artisans, such a special definition will be expressly set forth in the specification in a definitional manner that directly and unequivocally provides the special definition for the term or phrase.

Hereinafter, the term "current path" is, in particular, the serious connection or a series circuit of two switches. In particular, this refers to a series circuit of two semiconductors. The semiconductors preferably may be any kind of transistors which can fulfil the technical needs for a converter cell. Known transistor types are, for example, IGBT, or SiC transistors.

The joint where an emitter of the first transistor may be connected to a collector of a second transistor or a drain of a first transistor may be connected to a source of a second transistor, may be referred to as a "mid-point-connection" or a "middle-connection".

An improvement for a chain-link converter may be achieved, if the control channels of the parallel modules can be operated in a way that the shorting of the output of one channel does not disturb the operation of the remaining channel.

In case a chip in one of the modules fails, the parallel "healthy" switch, that means the switch which can still be activated or deactivated by its driver GD, can be permanently turned-on together with the other H-bridge switch connected to the same DC-link potential as the failed one.

Figure 6A:
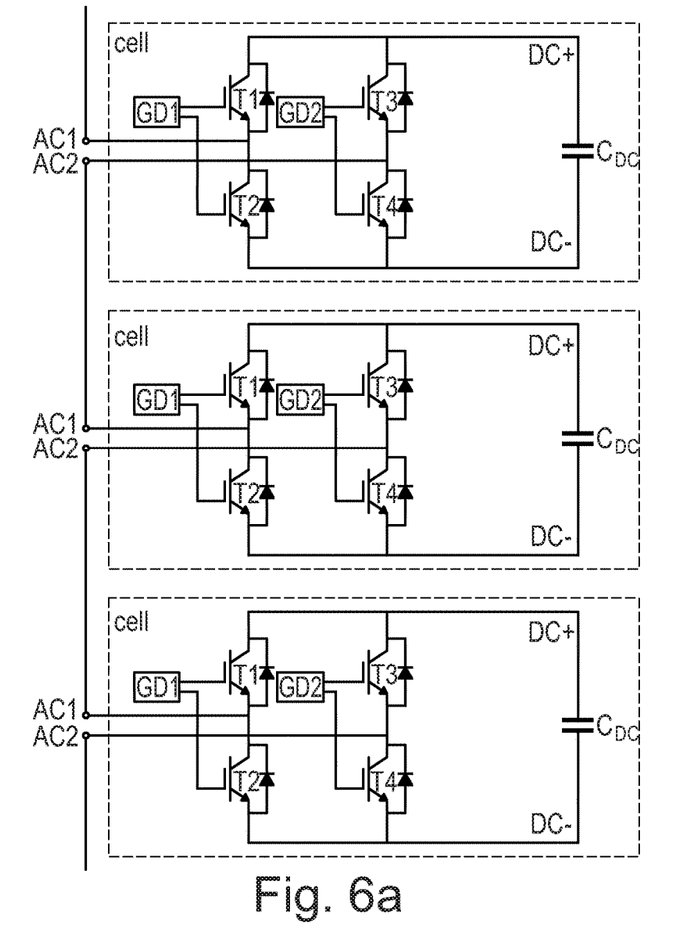
FIG. 6a shows a portion of a converter phase link with series connected chain-link cells (full bridge) without crowbar and without parallel switched modules.
Figure 6B:
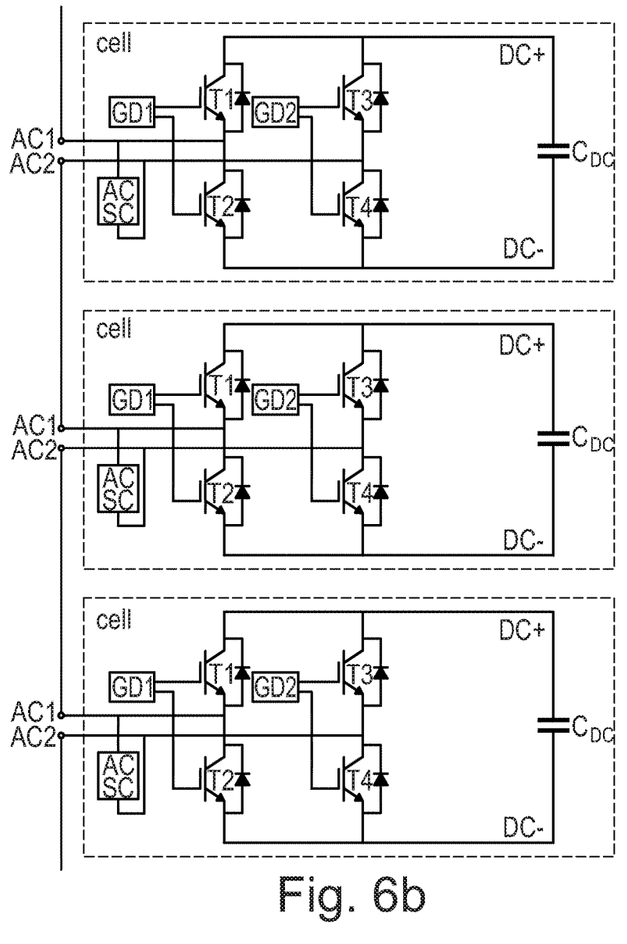
FIG. 6b shows a portion of a converter phase link with series connected chain-link cells (full bridge) without crowbar/parallel switched modules but with AC shorting devices

By this, the AC terminals are shorted ("zero vector"), while the switches connected to the other terminal of the DC-link remain off and block the DC-link voltage. Through this, installation, an additional AC shorting device could be avoided. By having at least one parallel path in each current path provided, the extra costs and the space required for an AC shorting device can be avoided, when utilizing the healthy switches in conjunction with a DC shorting device. FIG. 6b shows an example of a power converter phase leg, with chain link cells, connected in series. Between AC1 and AC2 terminals, a AC shorting device may be arranged.

Figure 1:
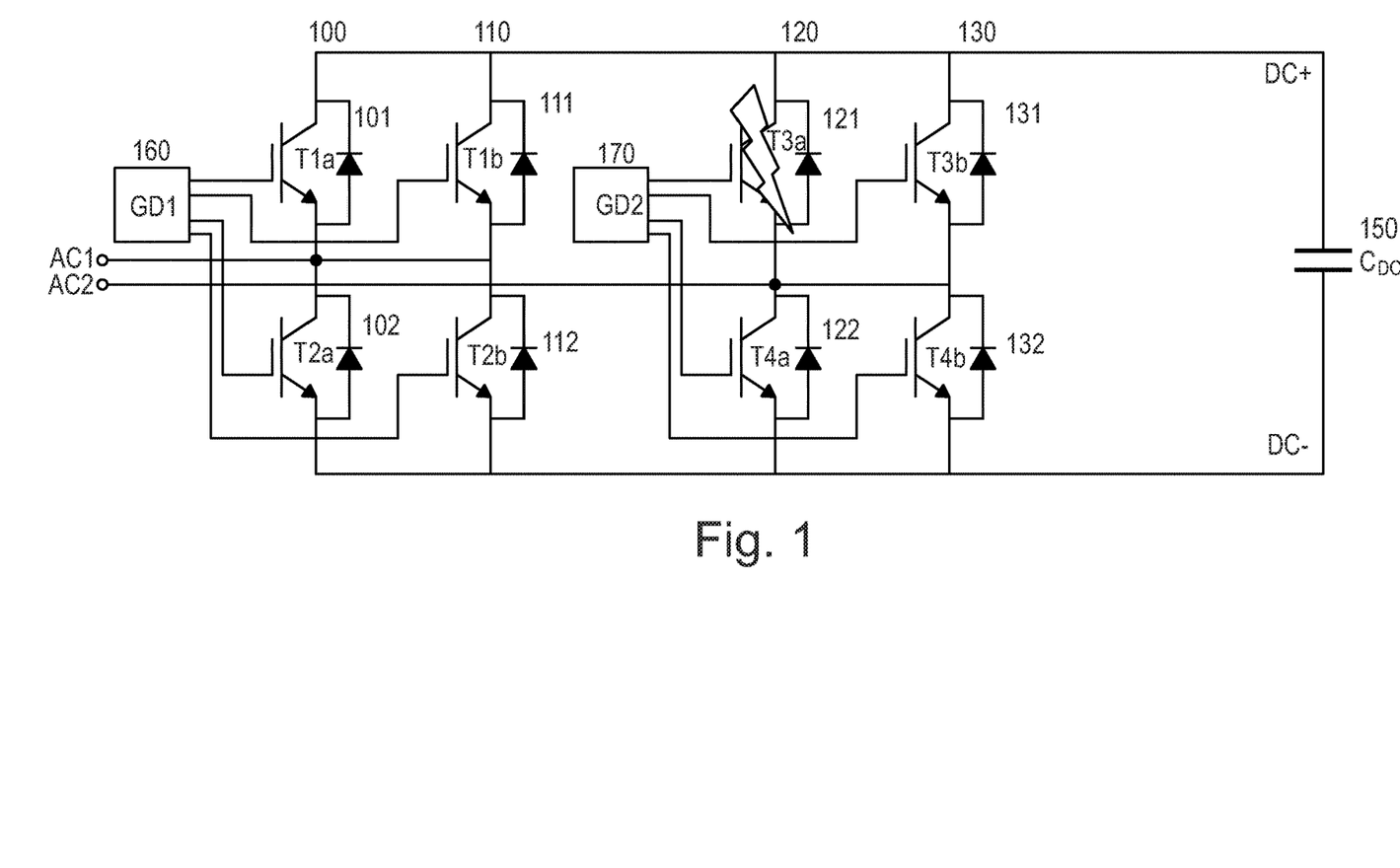
FIG. 1 shows an example of a full bridge cell according to embodiments of the present disclosure with a flash symbol indicating as an example a failed semiconductor switch.
Figure 4:
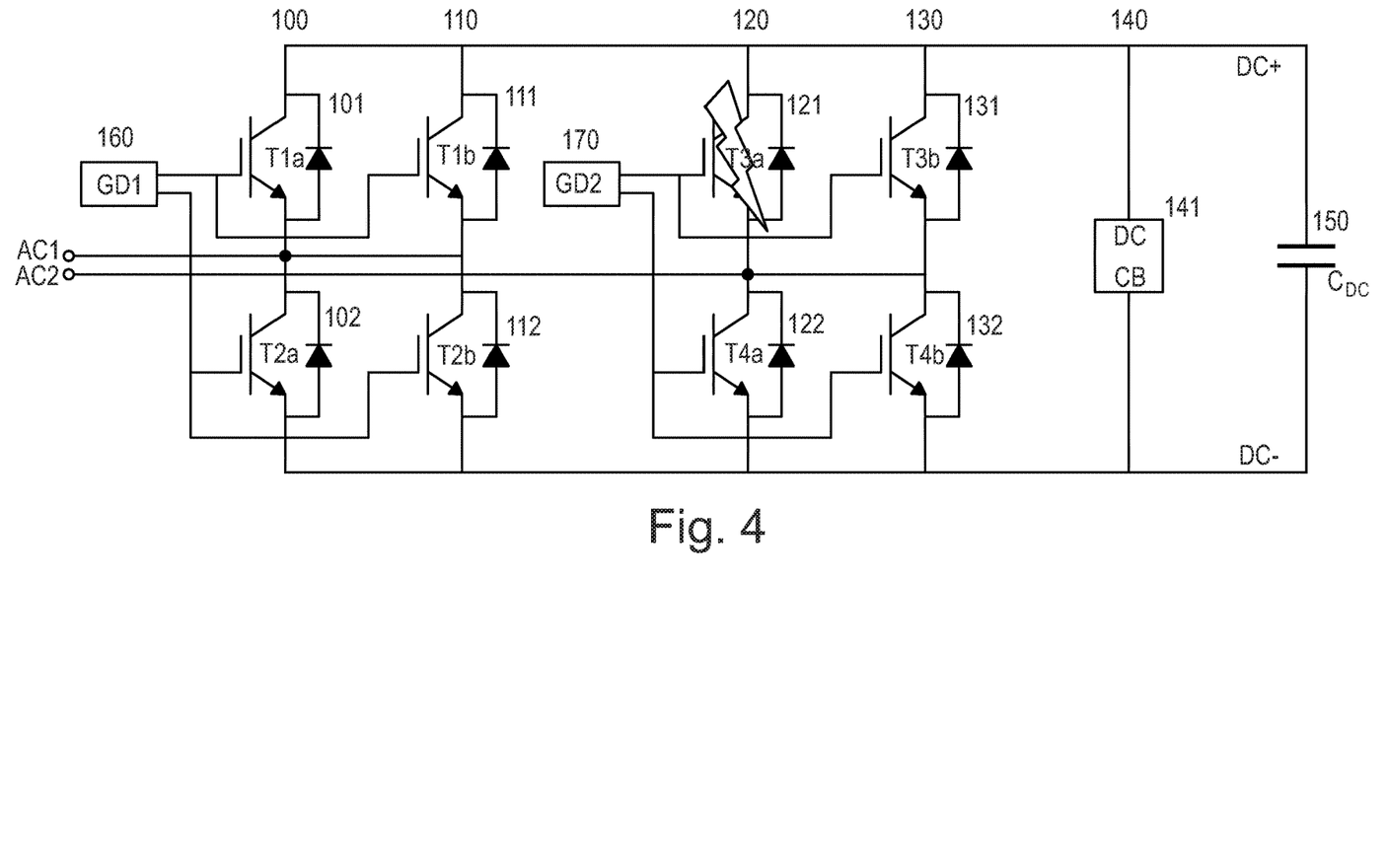
FIG. 4 shows an example of a full bridge cell with a crowbar, according to embodiments of the present disclosure with a flash symbol indicating as an example a failed semiconductor switch.
Figure 5:
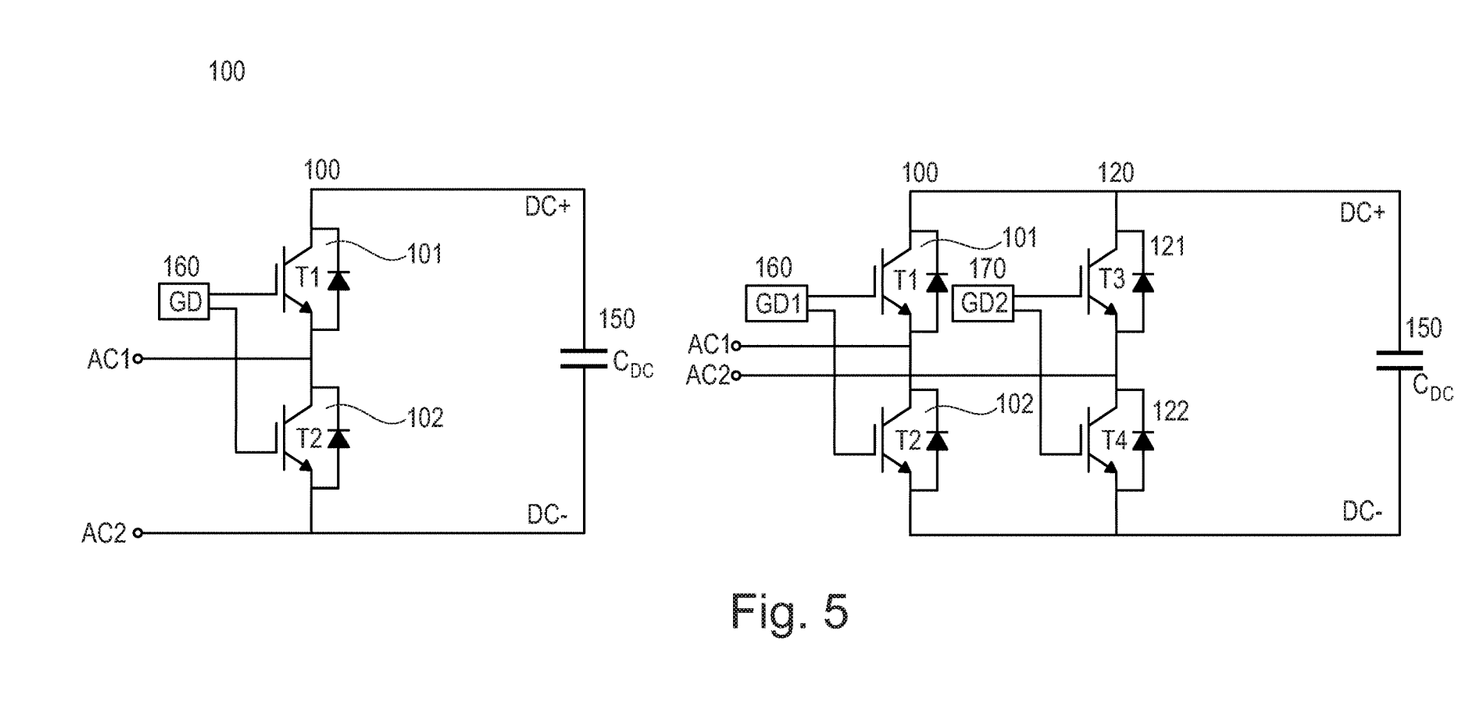
FIG. 5 shows a half and a full bridge without crowbar as currently used.

The full bridge topologies in FIGS. 1 and 4 show examples with two parallel semiconductor devices per switching function. Semiconductor T3a, 121 in path 120 may be fallen short. The full bridge cell in FIGS. 1 and 4 may not be operating any more. In a big chain-link converter, it may be desirable to keep the converter operable. That means, a short between the AC1 and AC2 connections must be established.

The total output voltage form of the converter may be slightly deformed by the lacking cell, but the converter may be still operable, since the number of cells in such a chain link converter may be very high and a lacking (but shorted) does not render the converter unusable. To achieve operability of the converter and to deactivate the cell, semiconductors T1a (and preferably T1b) in branches 100 and 110 of FIGS. 1 and 4 are activated from driver GD1. T3a may be assumed to have a "short" (currently "ON"). Current between AC1 and AC2 can flow in both directions due to the "free wheel" diodes which are arranged parallel to the semiconductors (transistors).

Depending on a real converter design, a portion or all of the capacity of the modules added to provide the parallel path can be utilized to increase the current carrying capability of the chain-link or MMC cell. The minimum advantage achieved may be that the additional capacity of the modules added to provide the parallel path can be utilized to increase the short term load ability of the cell. I.e. the extra costs for an additional current path are paid back by extra performance.

Figure 3:
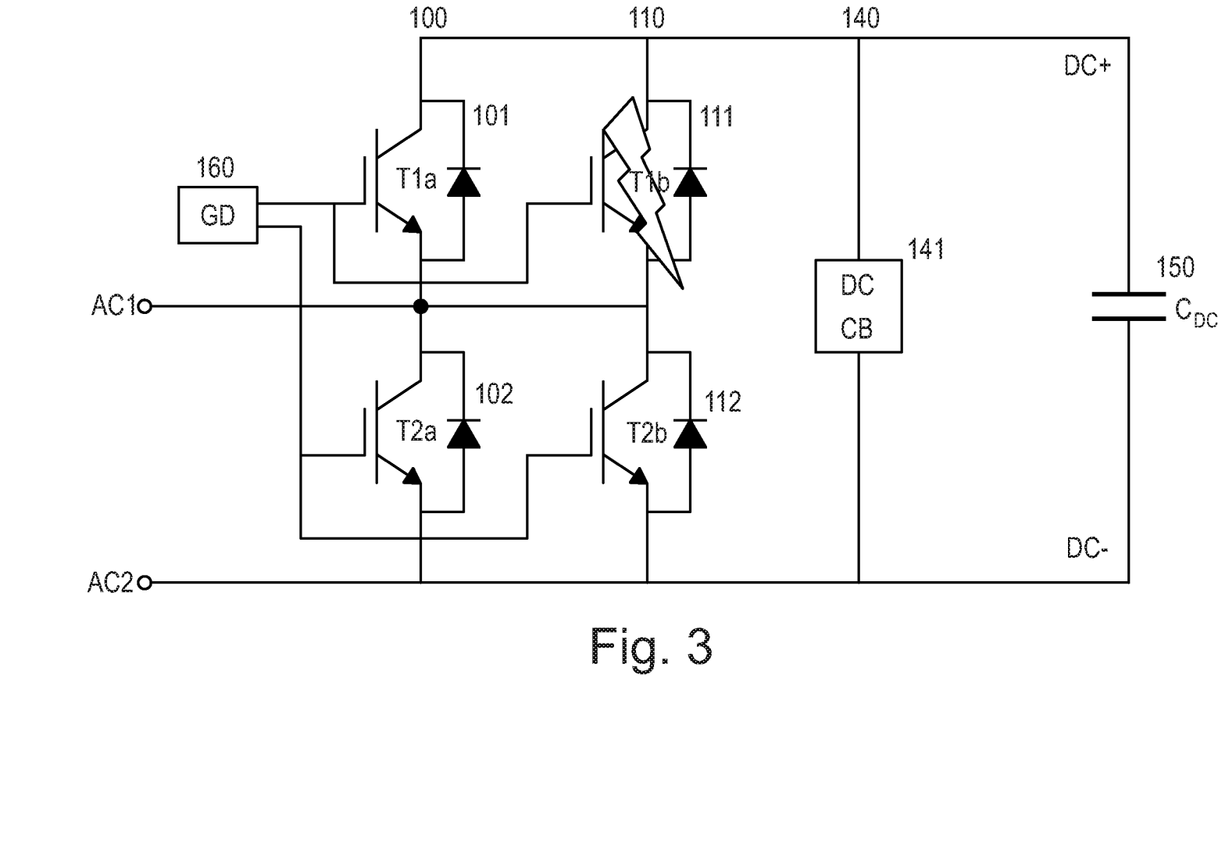
FIG. 3 shows an example of a half bridge cell with a crowbar, according to embodiments of the present disclosure with a flash symbol indicating as an example a failed semiconductor switch.

Adding a DC crowbar, which turns into a permanent short, once the DC capacitor energy may be partly discharged via it, to a cell with parallel current paths, allows to achieve a stable AC short for half-bridge and full-bridge cells without active control of the switches 101, 102, 111, 112, 121, 122, 131, 132 of the cell. FIG. 3 (half bridge with two parallel branches 100, 110 controllable by the same gate driver 160 (GD)) and FIG. 4 (full-bridge with two parallel branches in each channel) show this embodiment, using an additional crowbar 141, which may provide a stable short between AC1 and AC2. The free-wheeling diodes enable to let the current flow in both directions.

Therefore, in a first embodiment, an arrangement of switches 101, 102, 111, 112, 121, 122, 131, 132 for a voltage converter cell may be disclosed. The voltage converter cell may have two AC terminals, AC1 and AC2. The AC terminals are configured to output an AC current, converted by the voltage converter cell from a DC voltage (connected at DC+ and DC−, see figures). The arrangement of switches 101, 102, 111, 112, 121, 122, 131, 132 forms a number of 2N parallel current paths or branches 100, 110, 120, 130.

For a full bridge arrangement of switches, a total number of used parallel branches/current paths 100, 110, 120, 130, see FIG. 1 and FIG. 4, may be preferably an even number. The number N may be greater or equal "2".

The switches 101, 102, 111, 112, 121, 122, 131, 132 in each of the 2N current paths 100, 110, 120, 130 are being controlled by signals to alter a conductivity status of the switches 101, 102, 111, 112, 121, 122, 131, 132 between an "ON"-state and an "OFF"-state, wherein the signals are generated by one or more control units 160, 170. The control units 160, 170 which are controlling the switches may preferably be within an MMC cell.

The two AC terminals (AC1,AC2) are each connected to subsets of the 2N current paths 100, 110, 120, 130 with the switches 101, 102, 111, 112, 121, 122, 131, 132, wherein the control units 160, 170 comprise failure detection means, the failure detection means being adapted to determine a defective switch by predetermined conditions and wherein the control units 160, 170 are further configured to output a control signal to alter a conductivity condition of each of the 2N current paths 100, 110, 120, 130 in such a manner, that a short circuit between the two AC terminals (AC1, AC2) may be created, if one of the switches 101, 102, 111, 112, 121, 122, 131, 132 may be determined as being defective according to the predetermined conditions.

An "On"-state of a semiconductor (transistor) may denote the status, when the semiconductor has the lowest possible resistance (datasheet). An "off"-state denotes the semiconductor status with the highest possible resistance. Values between these max/min values may render the semiconductor defective, since the power which would be generated in the semiconductor according to $P=R \times I^2$ would instantly overheat and destroy the semiconductor if the switching process between "on" and "off" takes too long.

Subsets of the current paths or, to use another expression, "branches", may preferably be an even number. The subsets in the full-bride in FIGS. 1 and 4 have two current paths 100, 110, 120, 130 or branches. Each subset may be connected to a control unit 160 or 170.

In another aspect, an arrangement of switches (101, 102, 111, 112) for a voltage converter cell may be disclosed. The voltage converter cell having two AC terminals (AC1, AC2), wherein the arrangement of switches 101, 102, 111, 112 forms a number of N+1 two parallel current paths 100, 110, wherein the number N may be greater or equal "1" and wherein the switches 101, 102, 111, 112 in each of the N+1 current paths 100, 110 are being controlled by signals to alter a conductivity status of the switches 101, 102, 111, 112 between an "ON" state and an "OFF" state. The signals may be generated by one or more control units 160. The control units 160, 170 which are controlling the switches may preferably be within an MMC cell. The two AC terminals AC1, AC2 may be connected to the N+1 current paths 100, 110 with the switches 101, 102, 111, 112. The control units 160 may comprise failure detection means, the failure detection means being adapted to determine a defective switch (semiconductor/transistor) by predetermined conditions and wherein the control units 160 are further configured to output a control signal to alter a conductivity condition of each of the N+1 current paths 100, 110 in such a manner, that a short circuit between the two AC terminals (AC1, AC2) may be created, if one of the switches 101, 102, 111, 112 may be determined as being defective according to the predetermined conditions.

In the arrangement of switches 101, 102, 111, 112, 121, 122, 131, 132 for a converter cell, the switches may comprise semiconductors.

The arrangement of switches 101, 102, 111, 112, 121, 122, 131, 132 for a converter cell according to embodiments of the present application, wherein the semiconductors may preferably be transistors. In particular, transistors may preferably be IGBT's (insulated gate bipolar transistors), which can be arranged in specific modules. Other types of transistors e.g. SiC MOS FET's may also be possible, depending on their current and voltage rating.

In the arrangement of switches 101, 102, 111, 112, 121, 122, 131, 132 for a converter cell, a switch 141 may form a current path 140. The current path or branch 140 may preferably be switched electrically parallel to the 2N current paths or to the N+1 current paths.

Figure 2:
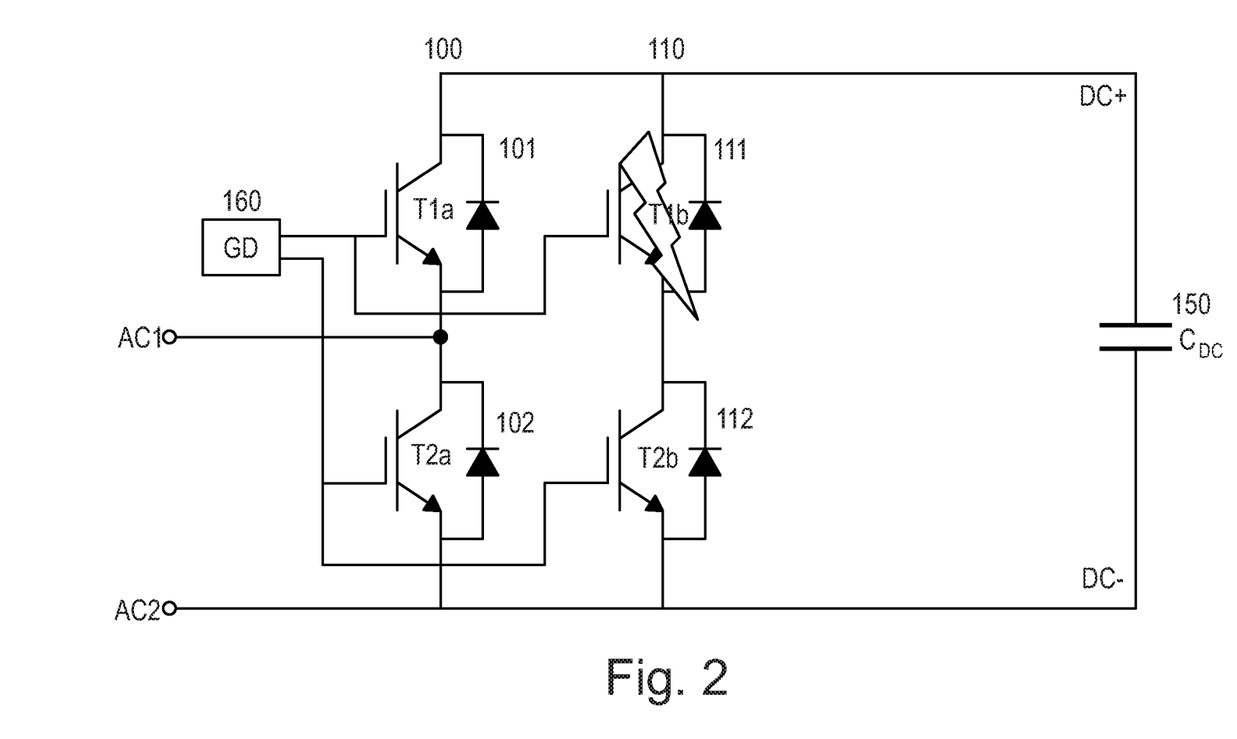
FIG. 2 shows an example of a half bridge cell according to embodiments of the present disclosure with a flash symbol indicating as an example a failed semiconductor switch.

For an MMC cell (half-bridge), active shorting of the broken switch does not help in all failure modes. Thus it cannot be applied as a general solution. A half-bridge cell has one AC-terminal connected to its DC capacitor (see FIG. 2). In case the switch fails which may be not connected between both terminals, the DC voltage may be continuously applied between the AC-terminals.

Thus, shorting the AC-terminals at the same time shorts the DC capacitor 150. This will in many cases result in an explosion of the semiconductor 101, 102, 111, 112, 121, 122, 131, 132 (IGBTs), which may be in the path of the discharge current. The energy is too high to be dissipated over the transistor paths. In particular, the semiconductor 101, 102, 111, 112, 121, 122, 131, 132 cannot dissipate in an instant the energy which may be stored in capacitor 150. Actually, current path or branch 140 may be placed as a DC capacitor discharging device (also called "crowbar") between the DC capacitor terminals.

By activating (firing) the semiconductor, also referred to as "crowbar", the capacitor 150 may be discharged in a dedicated path, designed for this event. In this case, it may be possible to avoid having to use decoupled control channels for the parallel modules, if the crowbar provided a continuous short. In this case the free-wheeling diodes provide for both current direction a short circuit path, for one current direction through the crowbar. Only with a parallel module this function can be guaranteed, because the conducting status of the diode chips in the module with the broken chip cannot be guaranteed.

Equipping a full-bridge cell, consisting of at least two parallel modules in each channel, with a DC crowbar, see FIG. 4, also allows to short the AC terminals permanently without the need for being able to actively control the status of the semiconductors.

Free-wheeling diodes, arranged parallel between collector/emitter (or drain/source) contacts of the transistors in the switches in the full-bridge, in conjunction with a DC crowbar, which may be permanently shorting the DC capacitor, may be able to advantageously permanently short the AC terminals without any active control of semiconductors (IGBTs).

In a further embodiment of the present application, according to other embodiments, the switch 141, forming branch 140, comprises a semiconductor based short circuit device. Preferably, the semiconductor for the short circuit device may be a thyristor. Any other semiconductor, capable of providing such a short-circuit function for a MMC cell may be used. Semiconductor may be not only restricted to thyristors.

In a further embodiment, in the arrangement of switches according to any embodiment, a capacitor 150 may be connected electrically parallel to the 2N current paths or to the N+1 current paths. The capacitor may be considered as a DC capacitor, storing energy for the cells.

In a further embodiment, in the arrangement of switches according to any embodiment, each of the 2N or the N+1 current paths or branches 100, 110, 120, 130 may comprise a series connection of two switches 101, 102, 111, 112, 121, 122, 131, 132. Each series connection of two switches 101, 102, 111, 112, 121, 122, 131, 132 has an electrical connection point located at that position, where the two switches of a current path are connected. Preferably, the connection point, or "mid-point" may denote the location, where a source and an emitter of transistors are connected. The mid-points in each of the subsets of 2N branches (full-bridge arrangement) are electrically connected and form the AC1 and AC2 terminals. Preferably, for a full-bridge, the number of subsets may be "2". Similarly, the mid-points in a half-bridge arrangement (N+1 branches) are electrically connected.

In a further embodiment, in the arrangement of switches according to embodiments, the connection points of the series connection of two switches 101, 102, 111, 112, 121, 122, 131, 132 in each of the subset of the 2N current paths are electrically connected with one of the AC terminals AC1, AC2.

In a further embodiment, in the arrangement of switches according to embodiments, the connection points of the series connection of two switches 101, 102, 111, 112, 121, 122, 131, 132 of the N+1 current paths may be connected to a first of the AC terminals AC1, AC2 and a second of the AC terminals AC1, AC2 may be connected to a "-" potential of a DC line.

In another aspect of the present disclosure, a modular multilevel converter cell comprising an arrangement of switches 101, 102, 111, 112, 121, 122, 131, 132, 141 according to embodiments of the invention may be disclosed. The arrangement of switches may be adapted for a modular multilevel converter cell with a half-bridge topology or for a modular multilevel converter cell with a full-bridge topology.

According to an aspect, the modular multilevel converter cell comprising an arrangement of switches 101, 102, 111, 112, 121, 122, 131, 132, 141 according to embodiments, may further comprise a network interface for connecting the modular multilevel converter cell to a data network, in particular a global data network like Internet.

In particular, the converter, or the cells of the Modular Multilevel Converter may be connected to an internal network that is assigned to the converter or the cells as an intermediate converter control. This internal network may be connected to the internet.

In other words, the converter or its cells communicate with a network, preferably on-site of the converter, and dedicated to control the functions of the converter. It may serve as an intermediate control layer.

The data network may be a TCP/IP network such as Internet. The modular multilevel converter cell or a controller within the converter cell may operatively be connected to the network interface for carrying out commands received from the data network via an internal network that is assigned to the converter as an intermediate converter control. Converters or converter cells may always be connected to Internet via an intermediate network, preferably a network directly connected (on-site) with the converter or converter cells.

The commands may include a control command for controlling the converter cell to carry out a task such as questioning status data or questioning operational data or measured sensor data. In this case, the converter cell or a controller of the converter cell (arranged inside or outside the cell) may be adapted for carrying out the task in response to the control command.

The commands may include a status request. In response to the status request, or without prior status request, the device/controller may be adapted for sending a status information to the network interface, and the network interface may be then adapted for sending the status information over the network. The commands may include an update command including update data. In this case, the device/controller may be adapted for initiating an update in response to the update command and using the update data.

The data network may be an Ethernet network using TCP/IP such as LAN, WAN or Internet. The data network may comprise distributed storage units such as Cloud. Depending on the application, the Cloud can be in form of public, private, hybrid or community Cloud.

The converter cell, in another embodiment, may further comprising a processing unit which may be configured to convert measured signals into a digital signal. The network interface may be configured to transceive the digital signal/data between the cell or the controller and the data network, wherein the digital signal/data include operational command and/or information about the cell or the network.

In another aspect, a method for shorting AC terminals of a modular multilevel converter cell may be disclosed. The method comprising: Determining a defective switch by predetermined conditions.

A defective semiconductor (transistor) may also mean, that the control unit may not be capable to switch the semiconductor in an "on"- or "off"-state, but the switch may still be operable and the control unit, sending control commands to the switches may be defective. In this respect, not only the switches may be controlled, but also the control unit, which outputs control signals for the switches. A control unit may therefore also be determined according to predetermined conditions. Such a condition may be e.g. a watch-dog timer, which can determine, if outputs of a controller are activated according to a specific time schedule.

In both cases, a switching status may be not changeable anymore and the AC terminals should be shorted to enable operability of the power converter.

According to another aspect of the present application, the method may comprise to activate a current path in form of a semiconductor-based short circuiting device (e.g. a crowbar) or activating switches (semiconductors, in particular transistors) in the current paths (branches) such, that a short circuit between the AC terminals may be generated. To activate the switches, a control device may be used.

According to another aspect of the present application, the method may further comprise to activate the switches in a way, that a switch, considered according to predetermined conditions as being healthy and operable, and arranged parallel to the switch being determined as defective, may be set, together with another switch, which may be connected to a same DC potential as the failed one, to a permanent "ON"-state. In another embodiment, a power converter comprising one or more cells according to embodiments of the present application may be disclosed. Further, features illustrated or described as part of one embodiment can be used on or in conjunction with other embodiments to yield yet a further embodiment. It may be intended that the description includes such modifications and variations.

While the foregoing may be directed to embodiments of the disclosure, other and further embodiments of the disclosure may be devised without departing from the basic scope thereof, and the scope thereof may be determined by the claims that follow.

The invention claimed is:

1. An arrangement of switches for a voltage converter cell, the voltage converter cell having two AC terminals,
    wherein the arrangement of switches forms a number of N+1 parallel current paths, wherein N is greater or equal to 1,
    wherein the switches in each of the N+1 current paths are controlled by external signals to alter a conductivity status of the switches between an "ON" state and an "OFF" state, the external signals being generated by one or more control units,
    wherein the two AC terminals are connected to the N+1 current paths with the switches,
    wherein the control units are configured to determine whether a switch of the arrangement of switches is detective according to predetermined conditions,
    wherein the control units are further configured to output a control signal to alter a conductivity condition of each of the N+1 current paths in such a manner, that a short circuit between the two AC terminals is created, if the switch of the arrangement of switches is determined as being defective according to the predetermined conditions, and
    wherein a semiconductor-based short circuit device forms a current path switched electrically parallel to the N+1 current paths and is configured to discharge a DC-link capacitor and to permanently short-circuit the two AC terminals in case the switch is determined as being defective.

2. The arrangement of switches for the voltage converter cell according to claim 1, wherein the switches are semiconductors.

3. The arrangement of switches for the voltage converter cell according to claim 2, wherein the semiconductors are IGBTs.

4. The arrangement of switches for the voltage converter cell according to claim 1, wherein a capacitor is connected electrically parallel to the N+1 current paths.

5. A modular multilevel converter cell comprising the arrangement of switches according to claim 1, wherein the arrangement of switches is adapted for a modular multilevel converter cell with a half-bridge topology or for a modular multilevel converter cell with a full-bridge topology.

6. The modular multilevel converter cell according to claim 5, further comprising a network interface for connecting the converter cell to a data network, wherein the converter cell or a controller of the converter cell, is operatively connected to the network interface for at least one of carrying out a command received from the data network and sending device status information to the data network and wherein the network interface is configured to transceive digital signal/data between the converter cell and the data network, and
    wherein the digital signal/data includes an operational command and/or information about the converter cell or the data network.

7. A method for shorting AC terminals of a modular multilevel cell, comprising:
    determining whether a first switch is defective according to predetermined conditions; and
    when the first switch is determined to be defective, generating a short circuit between the AC terminals, wherein generating the short circuit comprises activating a first current path coupled to the AC terminals in form of a semiconductor-based short circuiting device, or activating switches in second current paths coupled to the AC terminals.

8. The method for shorting AC terminals according to claim 7, comprising:
    setting a second switch considered as being healthy according to the predetermined conditions and arranged parallel to the first switch together with a third switch connected to a same DC potential as the first switch, to a permanent "ON"-state when the first switch is determined to be defective; or
    activating the semiconductor-based short circuiting device, forming current path and switched electrically parallel to the second current paths to discharge a DC-link capacitor and to permanently short-circuit the AC terminals when the first switch is determined to be defective.

9. The method for shorting AC terminals according to claim 7, wherein the activating the switches in the second current paths comprises setting a second switch and a third switch to a permanent "ON"-state, wherein the first switch is considered as being healthy according to the predetermined conditions and is arranged parallel to the first switch, and wherein the third switch is connected to a same DC potential as the first switch determined as being defective.

10. The method for shorting AC terminals according to claim 7, wherein the activating the first current path coupled to the AC terminals in form of the semiconductor-based short circuiting device comprises activating the semiconductor-based short circuiting device to form the first current path switched electrically parallel to the second current paths, to discharge a DC-link capacitor, and to permanently short-circuit the AC terminals the first switch is determined to be defective.

11. The method of claim 7, wherein the semiconductor-based short circuiting device comprises a thyristor, and activating the semiconductor-based short circuiting device comprises activating the thyristor.

12. A circuit, comprising:
    a converter cell comprising:
        an arrangement of switches coupled to two AC terminals, wherein the arrangement of switches forms a plurality of parallel current paths, and
        a semiconductor-based short circuit device coupled in parallel with the plurality of parallel current paths; and
    a control circuit coupled to the arrangement of switches, the control circuit configured to:
        alter a conductivity of each switch of the arrangement of switches between an "ON" state and an "OFF" state based on external signals,
        determine whether a switch of the arrangement of switches is defective according to predetermined conditions, and
        alter the conductivity of switches of the arrangement of switches to form a short circuit between the two AC terminals when the switch of the arrangement of switches is determined to be defective, and cause the semiconductor-based short circuit device to discharge a DC-link capacitor, and to permanently short-circuit the two AC terminals when the switch of the arrangement of switches is determined to be defective.

13. The circuit of claim 12, wherein the arrangement of switches comprises semiconductor switches.

14. The circuit of claim 13, wherein the semiconductor switches comprise IGBTs.

15. The circuit of claim 12, wherein the DC-link capacitor is coupled in parallel with the plurality of parallel current paths.

16. The circuit of claim 12, wherein the semiconductor-based short circuit device comprises a thyristor.

17. The circuit of claim 12, further comprising at least one further converter cell coupled to the converter cell.

18. The circuit of claim 17, wherein the converter cell and the at least further converter cell form a modular multilevel converter.

19. The circuit of claim 12, wherein the arrangement of switches form a half-bridge or a full-bridge.

* * * * *